United States Patent
Rodrigues et al.

(10) Patent No.: US 9,488,107 B2
(45) Date of Patent: Nov. 8, 2016

(54) TURBINE ENGINE FUEL INJECTOR WITH LEAKAGE FLOW CONTROLLED BY POSITION OF METERING VALVE

(71) Applicant: SNECMA, Paris (FR)

(72) Inventors: Jose Roland Rodrigues, Nandy (FR); Emilie Charlotte Pousseo, Paris (FR)

(73) Assignee: SNECMA, Paris (FR)

( * ) Notice: Subject to any disclaimer, the term of this patent is extended or adjusted under 35 U.S.C. 154(b) by 243 days.

(21) Appl. No.: 14/378,816

(22) PCT Filed: Feb. 7, 2013

(86) PCT No.: PCT/FR2013/050256
§ 371 (c)(1),
(2) Date: Aug. 14, 2014

(87) PCT Pub. No.: WO2013/124566
PCT Pub. Date: Aug. 29, 2013

(65) Prior Publication Data
US 2015/0292412 A1 Oct. 15, 2015

(30) Foreign Application Priority Data
Feb. 24, 2012 (FR) ...................... 12 51728

(51) Int. Cl.
| | |
|---|---|
| F02C 7/232 | (2006.01) |
| F02C 9/26 | (2006.01) |
| F02C 7/22 | (2006.01) |
| F23K 5/14 | (2006.01) |
| F23D 11/26 | (2006.01) |
| F23R 3/28 | (2006.01) |

(52) U.S. Cl.
CPC ................. *F02C 7/232* (2013.01); *F02C 7/22* (2013.01); *F02C 9/263* (2013.01); *F23D 11/26* (2013.01); *F23K 5/147* (2013.01); *F02C 7/222* (2013.01); *F23D 2214/00* (2013.01); *F23D 2900/00016* (2013.01); *F23N 2035/24* (2013.01); *F23R 3/28* (2013.01)

(58) Field of Classification Search
CPC .......... F02C 7/22; F02C 7/222; F02C 7/232; F02C 9/263; F23K 5/147; F23K 2900/05141; F23D 11/26; F23D 2900/00016; F23R 3/28; F23R 2900/00004
See application file for complete search history.

(56) References Cited

U.S. PATENT DOCUMENTS

| | | | |
|---|---|---|---|
| 4,655,912 A * | 4/1987 | Bradley ................. | F02C 9/263 210/133 |
| 2003/0093998 A1 | 5/2003 | Michau et al. | |
| 2003/0094203 A1 | 5/2003 | D'Agostino et al. | |
| 2009/0173810 A1* | 7/2009 | Rodrigues .............. | F02C 7/232 239/533.3 |
| 2010/0037615 A1 | 2/2010 | Williams et al. | |

FOREIGN PATENT DOCUMENTS

| | | |
|---|---|---|
| EP | 1 312 864 | 5/2003 |
| FR | 2 832 492 | 5/2003 |

OTHER PUBLICATIONS

U.S. Appl. No. 14/378,797, filed Aug. 14, 2014, Pousseo, et al.
International Search Report Issued Apr. 3, 2013 in PCT/FR13/050256 Filed Feb. 7, 2013.

* cited by examiner

*Primary Examiner* — Gerald L Sung
*Assistant Examiner* — Scott Walthour
(74) *Attorney, Agent, or Firm* — Oblon, McClelland, Maier & Neustadt, L.L.P.

(57) ABSTRACT

A fuel injector for a turbine engine, the injector including a body including a primary fuel circuit and a secondary fuel circuit fed by a metering valve. A leakage channel extends from a zone in fluid flow connection with the primary circuit to a zone in fluid flow connection with the secondary circuit. The leakage channel is configured to be open in a closed position of the metering valve and to be closed by the metering valve moving.

7 Claims, 3 Drawing Sheets

TURBINE ENGINE FUEL INJECTOR WITH LEAKAGE FLOW CONTROLLED BY POSITION OF METERING VALVE

The present invention relates to a fuel injector for a turbine engine such as an airplane turboprop or turbojet.

A turbine engine conventionally comprises an annular combustion chamber having fuel injectors regularly distributed at its upstream end together with means for feeding air around the injectors.

There are two main types of injector, namely so-called "aeromechanical" injectors having two fuel circuits providing fuel flow rates matching different operating stages of the turbine engine (starting stage, stages of operation at low power or at full power), and so-called "aerodynamic" injectors that have only one fuel circuit for all operating stages of the turbine engine.

Patent application FR 2 832 492 in the name of the Applicant describes an aeromechanical type injector having a primary fuel circuit, e.g. for starting and for low power stages, and a secondary circuit that is involved in subsequent operating stages at medium to high power, in addition to the primary circuit.

That type of injector comprises a body having admission means for admitting fuel under pressure, a stop valve mounted in the body downstream from the admission means and designed to open at a first determined fuel pressure and to remain open beyond said first pressure in order to feed a primary fuel circuit, and a metering valve mounted in the body downstream from the stop valve and designed to open beyond a second determined fuel pressure greater than the first pressure, and to remain open beyond the second pressure in order to feed a secondary fuel circuit.

The flow rate of fuel in the secondary circuit is controlled by means of metering slots formed in the metering valve and of flow sections that vary as a function of the position of the valve, i.e. as a function of the fuel feed pressure. The greater the fuel feed pressure, the greater the flow sections of the slots.

During stages of starting and operation at low power, the metering valve is closed. The fuel present in the secondary circuit does not flow, but it is subjected to high temperatures. That can lead to coking of the fuel in the secondary circuit, which is prejudicial to the proper operation and to the lifetime of the injector.

By way of example, that phenomenon occurs while the airplane is descending, during a period of operating at low power following a period of operating at full power. Under such circumstances, the environment of the injector may reach temperatures lying in the range 80° C. to 600° C.

Means exist for limiting the heating of fuel in the secondary circuit, such as installing one or more heat shields. Is also possible to envisage generating a fuel leak from the primary circuit to the secondary circuit.

Such a leak would prevent fuel from stagnating in the secondary circuit and would thus avoid the fuel coking.

Nevertheless, that leak would be present over the entire operating range of the turbine engine, i.e. not only during starting and when operating at low power, but also when operating at full power, and it would generate non-uniformity in the combustion chamber, which would be harmful for the performance of the turbine engine.

A particular object of the invention is to provide a solution to this problem that is simple, effective, and inexpensive.

For this purpose, the invention proposes a fuel injector for a turbine engine such as an airplane turboprop or turbojet, the injector comprising a body having admission means for admitting fuel under pressure, a stop valve mounted in the body downstream from the admission means and designed to open at a first determined fuel pressure and to remain open beyond said first pressure in order to feed a primary fuel circuit, and a metering valve mounted in the body downstream from the stop valve and designed to open beyond a second determined fuel pressure greater than the first pressure, and to remain open beyond the second pressure in order to feed a secondary fuel circuit, the injector being characterized in that it includes at least one leakage channel extending from a zone situated downstream from the stop valve and upstream from the metering valve to a zone situated downstream from the metering valve in order to generate a permanent leakage flow in the secondary circuit, the leakage channel being designed to be open in a closed position of the metering valve and to be closed by the metering valve moving.

In this way, a leakage flow flows through the leakage channel and feeds the secondary circuit only while the metering valve is closed, i.e. only during the stages of starting and of low-power operation.

In contrast, during a stage of operating at medium or high power, the feed pressure of the fuel is high enough to move and open the metering valve, thereby causing the leakage channel to be closed and thus interrupting the leakage flow.

Such an injector thus avoids coking of the fuel present in the secondary circuit during starting and low-power stages, but without penalizing the performance of the turbine engine at medium or high power.

According to a characteristic of the invention, the body includes at least a first chamber situated downstream from the stop valve and upstream from the metering valve, in fluid flow connection with or belonging to the primary fuel circuit, at least a second chamber situated downstream from the metering valve and suitable for being isolated from the first chamber by the metering valve when it is closed, the second chamber being in fluid flow connection with or forming part of the secondary fuel circuit, the leakage channel being formed in the metering valve so as to connect together the first and second chambers when the metering valve is in a closed position.

Preferably, the metering valve is closed over a first portion of its stroke and then opens progressively over a second portion of its stroke, closure of the leakage channel taking place over the first portion of the stroke of the metering valve.

The leakage channel thus closes before the metering slots of the metering valve open out into the zone situated downstream from said valve and connected to the secondary circuit.

According to another characteristic of the invention, the leakage channel includes calibration means for calibrating the leakage flow rate.

Under such circumstances, the metering valve is mounted to move in sealed manner in a tubular portion that is stationary relative to the body, the tubular portion including at least one leakage orifice, the leakage channel formed in the metering valve including a first end for opening out facing the leakage orifice when the metering valve is in a closed position and for being moved away from the leakage orifice by the movement of the metering valve, the leakage channel also including a second end that opens out into the second chamber.

Advantageously, the leakage channel includes a portion extending along the axis of the metering valve, opening out into the second chamber, and having mounted therein the leakage flow rate calibration means, and a radial portion opening out into the axial portion of the leakage channel and facing the leakage orifice.

The invention also provides a turbine engine, such as an airplane turboprop or turbojet including at least one injector of the above-specified type.

The invention can be better understood and other details, characteristics, and advantages appear on reading the following description made by way of non-limiting example and with reference to the accompanying drawings, in which.

Figure 1:
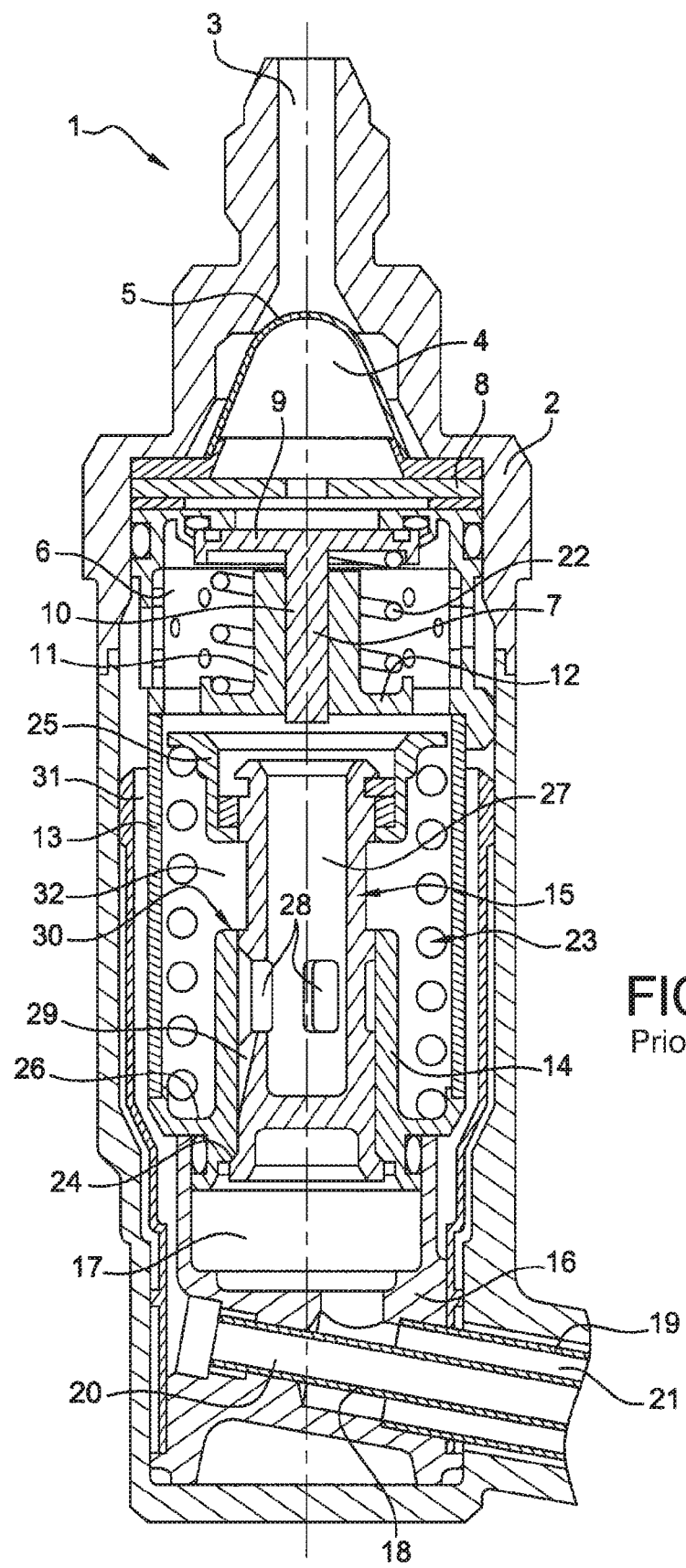
FIG. 1 is a longitudinal section view of a prior art fuel injector.

A fuel injector 1 as disclosed in patent application FR 2 832 492 in the name of the Applicant is shown in FIG. 1.

That injector 1 is of the aeromechanical type and includes a primary fuel circuit, e.g. for use during starting and low-power stages, and a secondary circuit that is involved during later stages of operation, at medium and high power, in addition to the primary circuit.

The injector 1 has a hollow body 2 with a fuel admission orifice 3 that is to receive the fuel under pressure coming from a fuel pump (not shown), and opening out into a pre-admission chamber 4 after passing through a filter screen 5.

The body 2 also has an admission chamber 6 situated downstream (in the flow direction for fuel through the injector) from the pre-admission chamber 4 and separated therefrom by a stop valve 7. A diaphragm 8 is placed between the pre-admission chamber 4 and the stop valve 7.

The stop valve 7 has a head 9 and a stem 10 movably mounted in a tubular portion 11 of an annular support 12 that is stationary relative to the body 2. The support rests on a tubular bushing 13 extending downwards and itself resting on another tubular support 14 having a metering valve 15 mounted therein. Finally, the support 14 rests on a part 16 defining a reception chamber 17 situated under the metering valve 15 and serving to support two coaxial tubes 18 and 19.

The inner tube 18 forms a duct 20 for passing a primary flow of fuel, the annular space between the two tubes 18 and 19 forming a duct 21 for passing a secondary flow of fuel.

An annular space 31 forming part of the primary circuit is defined between the outer wall of the bushing 13 and the body 2. The inner wall of the bushing 13 also defines an inner chamber 32 situated upstream from the metering valve 15.

The stop valve 7 is held in the closed position by a return spring 22, with the stop valve 7 being opened when the pressure of the fuel upstream from this valve exceeds a first predetermined value P1.

The metering valve 15 is also held in the closed position by a return spring 23, with the metering valve 15 opening when the pressure of the fuel upstream from the valve 15 exceeds a second predetermined value P2, greater than the above-mentioned first value P1.

The metering valve 15 has a bottom end forming a head that is to rest on a seat 24 of the corresponding support, and a top end where a cup 25 is fastened. The return spring bears firstly against the cup 25 and secondly against a radial surface 26 of the support 14.

The metering valve 15 has a central axial hole 27 and radial openings 28 opening out into the central hole 27 and into metering slots 29 presenting appropriate shapes that are formed in the outer surface of the metering valve 15.

The metering valve 15 is movable between two extreme positions, respectively a completely closed position in which its head rests on the seat 24 of the support 14 under the action of the corresponding return spring 23, and a completely open position in which the cup 25 comes into abutment against the top end 30 of the tubular support 14.

In the completely closed position of the metering valve 15, as shown in FIG. 1, the openings 28 and the slots 29 are situated facing the tubular support 14, the bottom ends of the slots 29 not opening out into the reception chamber 17. In this position, the fuel present in the chamber 32 thus cannot flow into the reception chamber 17 or into the secondary duct 21.

When the pressure of the fuel situated in the chamber 32 increases, this pressure causes the metering valve 15 to move towards its open position, i.e. downwards, against the force exerted by the return spring 23.

When this pressure exceeds the second value P2, the slots 29 open out into the reception chamber 17 and the fuel can flow into the secondary duct 21.

The shapes of the slots 29 are such that the flow sections of the slots 29 vary as a function of the position of the metering valve 15. In particular, the higher the pressure of the fuel in the chamber 27, the larger the flow sections of the slots 29.

In operation, several situations may arise.

In a first situation, the pressure of the fuel in the preadmission chamber 4 is less than P1. The stop valve 7 is then held in the closed position by the return spring 22 and the fuel flows neither into the primary duct 20 nor into the secondary duct 21.

In a second situation, corresponding to a starting stage or to operating at low power, the pressure of the fuel in the preadmission chamber 4 is greater than P1, but the pressure of the fuel in the chamber 32 is less than P2. The stop valve 7 is then open and the fuel can flow into the annular space 31 and then into the primary duct 20 (primary circuit). The metering valve 15 nevertheless remains closed, and the fuel does not flow in the secondary duct 21.

In a third situation, corresponding to a stage of operating at medium or full power, the pressure of the fuel in the preadmission chamber 4 is greater than P1 and the pressure of the fuel in the chamber 32 is greater than P2. The stop valve 7 is open and the fuel can flow into the annular space 31 and then into the primary duct 20 (primary circuit). In addition, the metering valve 15 is also open and the fluid can flow through the chamber 32, the openings 28, the slots 29, and the reception chamber 17, and then the secondary duct 21 (secondary circuit).

As mentioned above, in the second operating situation, the secondary duct 21 may be subjected to an environment that is very hot and there is a risk of the fuel that is present in the duct 21 coking.

FIGS. 2 to 5 show a portion of an injector of the invention, in which the tubular support 17 includes openings 33 situated, at least in part, facing an annular groove 34 formed in the outer wall of the metering valve 15. The slots 29 extend axially and open out at their top ends into the annular groove 34.

The openings 33 and the annular groove 34 are dimensioned in such a manner that, regardless of the position of the admission valve 15, at least some of the openings 33 are situated facing the annular groove 34.

The tubular support 17 also includes at least one orifice 35 that is situated, at least in part, facing an annular groove 36 formed in the outer wall of the metering valve 15 when the metering valve 15 is in its completely closed position, i.e. when it is resting on its seat 24.

The groove 36 is situated above the groove 34. Leakage channels 37 extend radially in the metering valve 15 and open out both into the groove 36 and also into an axial central hole 38 of the metering valve 15. The central hole 38 opens out into the head of the valve 15, in the reception chamber 17. Calibration means 39 for calibrating the leakage rate are mounted in the central hole 38.

In this way, when the orifice 35 is situated facing the groove 36, then the fuel leakage flow can pass in succession through the orifice 35, the groove 36, the leakage channels 37, the hole 38, the calibration means 39, and the reception chamber 17 in order to ensure that there is a flow of fuel in the secondary duct 21.

When the metering valve 15 moves, the leakage flow is interrupted when the groove 36 is moved axially away from the orifice 35 so as to close the leakage channels 37. The total stroke of the metering valve 15 between its two extreme positions may be subdivided into a first portion in which the valve 15 remains closed, and a second portion in which the valve 15 opens progressively.

The orifice 35 and the groove 36 are dimensioned in such a manner that the leakage channels 37 close over the first portion of the stroke of the metering valve 15, i.e. before the slots 29 open out into the reception chamber 17.

Figure 2:
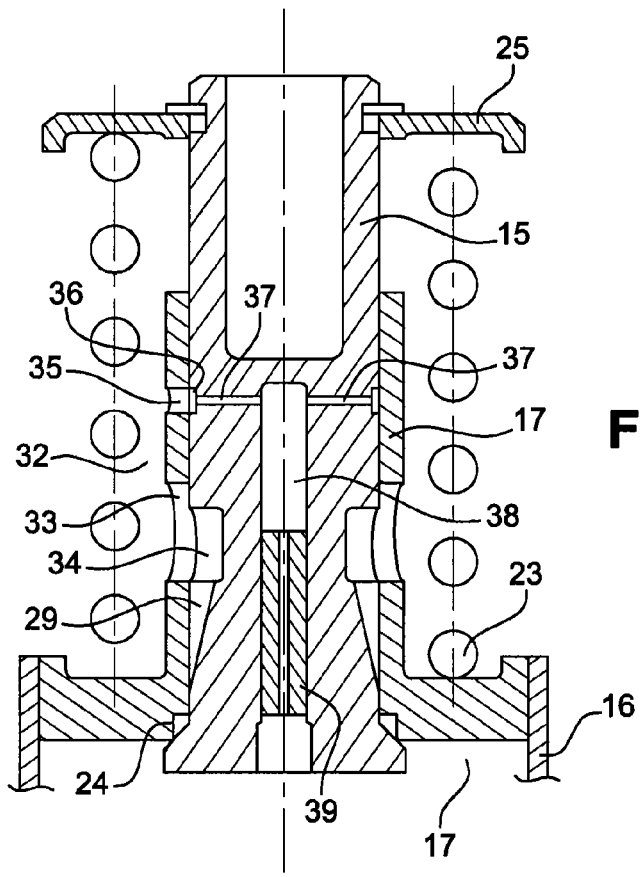
FIGS. 2 to 5 are longitudinal section views of a portion of an injector of the invention in four successive positions of the metering valve.
Figure 3:
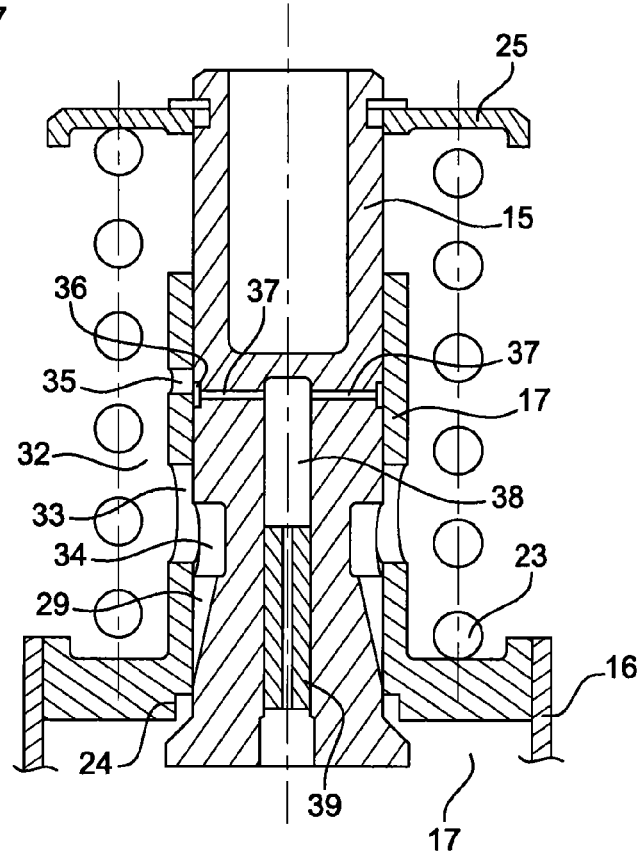
Figure 4:
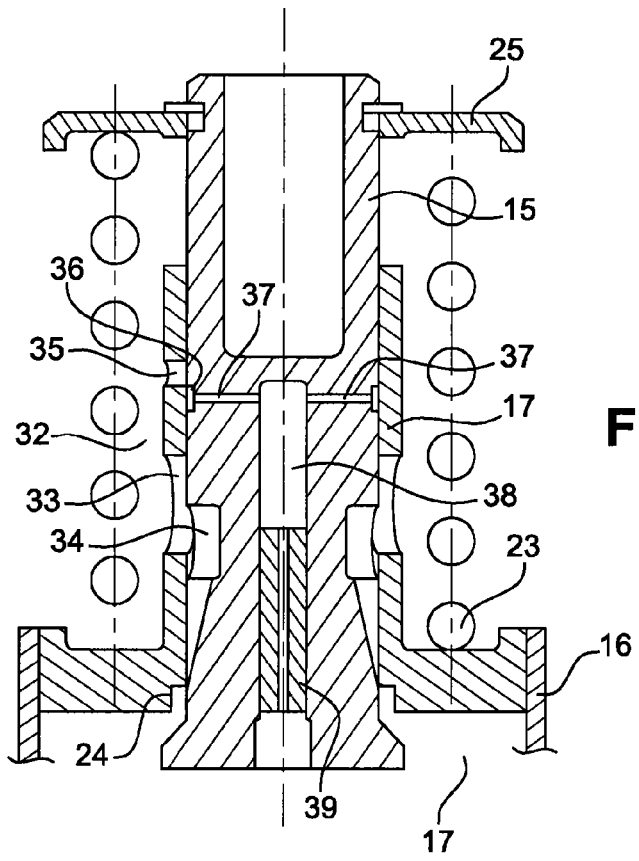

FIGS. 2 to 4 show various successive positions of the metering valve 15, illustrating the operation of the injector of the invention.

FIG. 2 shows the metering valve 15 in its completely closed position in which it is resting on its seat 24. In this position, the orifice 35 is situated facing the groove 36 so as to establish a leakage flow and so that fuel flows through the secondary duct 21 during stages in which the turbine engine is being started or is operating at low power.

By way of example, the leakage flow rate may be less than 1 liter per hour (L/h), and is preferably about 0.5 L/h.

When the fuel pressure upstream from the metering valve increases, the metering valve is moved downwards so as to move progressively away from the groove 36 of the orifice 35 (FIG. 3) until the leakage channels 37 are completely closed (FIG. 4).

Figure 5:
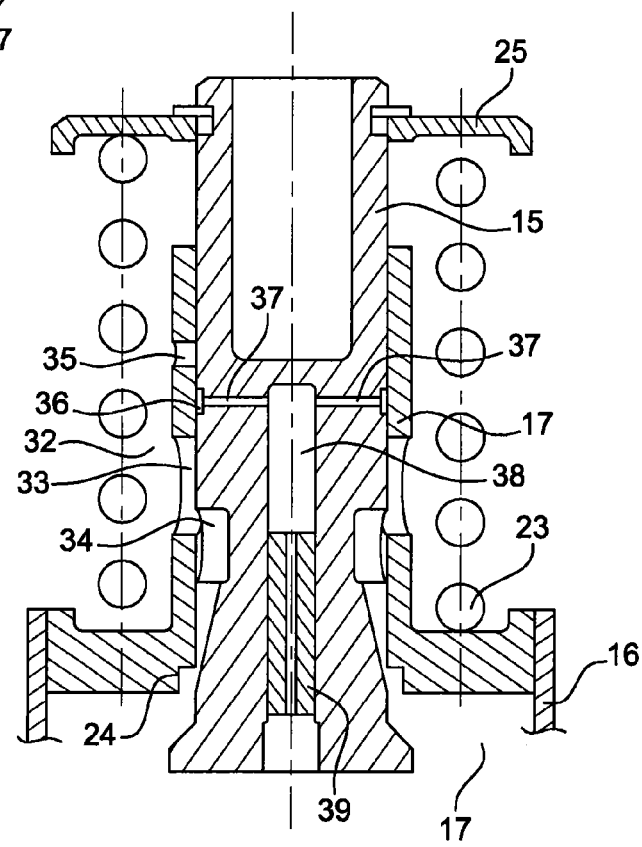

By further increasing the fuel pressure upstream from the metering valve 15, e.g. when operating at medium or full power, the slots 29 open out into the reception chamber 17 and fuel can flow in the secondary duct 21 (FIG. 5).

The invention thus proposes an injector that makes it possible to avoid coking of the fuel present in the secondary circuit during starting and low-power stages, but without penalizing the performance of the turbine engine at medium or high power.

The invention claimed is:

1. A fuel injector for a turbine engine or an airplane turboprop or turbojet, the fuel injector comprising:
    a body including an admission orifice for admitting fuel under pressure;
    a stop valve mounted in the body downstream from the admission orifice and configured to open at a first determined fuel pressure and to remain open beyond the first determined fuel pressure to feed a primary fuel circuit;
    a metering valve mounted in the body downstream from the stop valve and configured to open beyond a second determined fuel pressure greater than the first determined fuel pressure, and to remain open beyond the second determined fuel pressure to feed a secondary fuel circuit; and
    at least one leakage channel extending from a zone situated downstream from the stop valve and upstream from the metering valve to a zone situated downstream from the metering valve to generate a leakage flow in the secondary circuit, the at least one leakage channel being configured to be open in a closed position of the metering valve and to be closed by the metering valve moving.

2. The fuel injector according to claim 1, wherein the body includes at least a first chamber situated downstream from the stop valve and upstream from the metering valve, in fluid flow connection with or belonging to the primary fuel circuit, at least a second chamber situated downstream from the metering valve and configured to be isolated from the first chamber by the metering valve when the metering valve is closed, the second chamber being in fluid flow connection with or forming part of the secondary fuel circuit, the at least one leakage channel being formed in the metering valve to connect together the first and second chambers when the metering valve is in the closed position.

3. The fuel injector according to claim 1, wherein the metering valve is closed over a first portion of a stroke and then opens progressively over a second portion of the stroke, closure of the at least one leakage channel taking place over the first portion of the stroke of the metering valve.

4. The fuel injector according to claim 1, wherein the at least one leakage channel includes a calibration tube for calibrating a leakage flow rate.

5. The fuel injector according to claim 2, wherein the metering valve is mounted to move in a sealed manner in a tubular portion that is stationary relative to the body, the tubular portion including at least one leakage orifice, the at least one leakage channel formed in the metering valve including a first end for opening out facing the at least one leakage orifice when the metering valve is in the closed position and for being moved away from the at least one leakage orifice by movement of the metering valve, the at least one leakage channel also including a second end that opens out into the second chamber.

6. The fuel injector according to claim 5, wherein the at least one leakage channel includes an axial portion extending along an axis of the metering valve, opening out into the second chamber, and including mounted therein a leakage flow rate calibration tube, the at least one leakage channel further including a radial portion opening out into the axial portion and facing the at least one leakage orifice.

7. A turbine engine or an airplane turboprop or turbojet comprising at least one fuel injector according to claim 1.

* * * * *